United States Patent
Nagareda

(10) Patent No.: US 11,965,994 B2
(45) Date of Patent: Apr. 23, 2024

(54) ULTRASONIC TRANSDUCER FOR A MEASURING DEVICE

(71) Applicant: HONDA ELECTRONICS CO., LTD., Aichi (JP)

(72) Inventor: Kenji Nagareda, Aichi (JP)

(73) Assignee: HONDA ELECTRONICS CO., LTD., Aichi (JP)

(*) Notice: Subject to any disclaimer, the term of this patent is extended or adjusted under 35 U.S.C. 154(b) by 0 days.

(21) Appl. No.: 18/224,101

(22) Filed: Jul. 20, 2023

(65) Prior Publication Data
US 2024/0036181 A1 Feb. 1, 2024

(30) Foreign Application Priority Data

Jul. 26, 2022 (JP) .................. 2022-118435

(51) Int. Cl.
| | |
|---|---|
| G01S 7/521 | (2006.01) |
| B06B 1/06 | (2006.01) |
| G01N 29/00 | (2006.01) |
| G01N 29/22 | (2006.01) |
| G01S 7/52 | (2006.01) |

(52) U.S. Cl.
CPC ............ *G01S 7/521* (2013.01); *B06B 1/0685* (2013.01); *G01N 29/00* (2013.01); *G01N 29/22* (2013.01); *G01S 7/52015* (2013.01)

(58) Field of Classification Search
CPC ... G01S 7/521; G01S 7/52015; B06B 1/0685; G01N 29/22; G01N 29/24; G01N 29/00
See application file for complete search history.

(56) References Cited

U.S. PATENT DOCUMENTS

| | | | |
|---|---|---|---|
| 11,389,832 B2 * | 7/2022 | Lewis, Jr. | ............... B06B 1/064 |
| 2017/0265844 A1 * | 9/2017 | Nishiwaki | ............... A61B 8/54 |

FOREIGN PATENT DOCUMENTS

| | | |
|---|---|---|
| JP | 63-181676 | 7/1988 |
| JP | 64-043783 | 2/1989 |
| JP | 05-244691 | 9/1993 |
| JP | 08-140984 | 6/1996 |
| JP | 2006-319592 | 11/2006 |
| JP | 2016-213666 | 12/2016 |

* cited by examiner

*Primary Examiner* — Kristina M Deherrera
*Assistant Examiner* — Jean F Morello
(74) *Attorney, Agent, or Firm* — Clark & Brody LP

(57) ABSTRACT

An ultrasonic transducer for a measuring instrument includes a housing container with a support plate and a piezoelectric element that is supported by the support plate and has a substantially circular shape. The piezoelectric element includes multiple substantially sector-shaped oscillation parts that are divided by multiple grooves that communicate with each other at the central part and extend radially. The piezoelectric element oscillates in the thickness direction A3 in the first frequency band and in the radial direction A4 in the second frequency band, which is lower than the first frequency band. The ultrasonic transducer is capable of expanding the frequency band suitable for transmitting and receiving ultrasound.

9 Claims, 12 Drawing Sheets

(a) ($\theta=15°$)

(b) ($\theta=45°$)

(c) ($\theta=60°$)

ULTRASONIC TRANSDUCER FOR A MEASURING DEVICE

TECHNICAL FIELD

The present invention relates to an ultrasonic transducer for a measuring device, which transmits and receives ultrasonic waves.

TECHNICAL BACKGROUND

Conventionally, a sonar device that detects a target object such as a school of fish by transmitting and receiving ultrasonic waves has been known. According to this type of fish finder, it is possible to detect something underwater by transmitting and receiving ultrasonic waves while actuating the ultrasonic transducer. Then, the result of the underwater detection is displayed on a screen as the detected image.

Incidentally, an ultrasonic transducer for a fish finder typically employs disk-shaped or annular piezoelectric elements. These are designed to transmit and receive two types of ultrasonic waves from a single transducer: for example, at 200 kHz for thickness directional oscillation, and at 50 kHz for radial direction oscillation. However, the frequency bands of these types of ultrasonic waves from such piezoelectric elements are narrow. In recent years, the number of vessels equipped with similar fish finders has been increasing, leading to a higher likelihood of interferences with other vessels. To avoid such interference, it would be advisable to transmit and receive ultrasonic waves outside the operating frequencies used by nearby vessels. But in the case of narrow frequency bands, the range of frequency options available for changing becomes limited. Therefore, there is a demand for ultrasonic transducers with wider ultrasonic frequency bands.

In addition, as a method to widen the ultrasonic band, as shown in FIGS. 18 and 19, it has been proposed to form multiple grooves 193 that extend in the same direction in the piezoelectric element 192 that forms the ultrasonic transducer 191 and to arrange multiple oscillating parts 194 through the grooves 193 (See e.g., Patent Document 1). In this way, each oscillating part 194 is more likely to deform in the thickness direction of the piezoelectric element 192. As a result, the piezoelectric element 192 is more likely to oscillate in the thickness direction across the entire area, thus increasing the electromechanical coupling coefficient, and further widening the frequency band.

PRIOR ARTS

Patent Documents

Patent Document 1: Japanese Unexamined Patent Application Publication No. 2016-213666 (Paragraph 0023, FIGS. 1, 3, 4A, etc.)

SUMMARY OF THE INVENTION

Problem to be Solved by the Invention

However, Patent Document 1 refers to a technology that mainly facilitates the oscillation of the piezoelectric element 192 in the thickness direction. Therefore, it is difficult to say that a frequency band suitable for the transmission and reception of ultrasonic waves has been sufficiently obtained. Hence, there is a demand to broaden the frequency band of ultrasonic waves.

The present invention has been made in view of the above-mentioned problems, and its purpose is to provide an ultrasonic transducer for a measuring device, which can broaden the frequency band suitable for the transmission and reception of ultrasonic waves.

Means for Solving the Problems

To solve the above problems, the first aspect of the present invention refers to an ultrasonic transducer for a measuring device that transmits and receives ultrasonic waves, comprising: a housing container with a support body; and a piezoelectric element with a substantially circular outer shape supported by the support body, wherein the piezoelectric element is composed of multiple substantially sector-shaped oscillation parts divided by multiple grooves that are interconnected and radiate from the central part and oscillates in the thickness direction in the first frequency band, so as to oscillate in the thickness direction of the first frequency band as well as to oscillate in the radial direction in the second frequency band, which is lower than the first frequency band.

Therefore, according to the first aspect of the present invention, the piezoelectric element is composed of multiple oscillation parts divided by the grooves, thus making each oscillation part easier to deform in the thickness direction. As a result, the piezoelectric element oscillates in the thickness direction across the entire area, thus increasing the electromechanical coupling coefficient. Therefore, the transmission/reception sensitivity in the first frequency band, which is the frequency band for thickness directional oscillation, becomes high, and the range of the first frequency band also expands. Moreover, since each oscillation part that forms the piezoelectric element is substantially sector-shaped, when driven at the resonance frequency of radial oscillation, the end of the central part of the oscillating part, that is, the center of the substantially circular-shaped ultrasonic oscillator, oscillates with a large amplitude. As a result, the transmission/reception sensitivity in the second frequency band, which is the frequency band for radial direction oscillation, increases. From the above, it is possible to perform high sensitivity transmission and reception in both the thickness directional oscillation and radial direction oscillation.

In addition, a piezoelectric element with a "substantially circular shape" includes not only a piezoelectric element with a circular shape but also a piezoelectric element with an elliptical shape and a piezoelectric element with an oval shape.

The second aspect of the present invention refers to an ultrasonic transducer for a measuring device according to the first aspect of the present invention, wherein the piezoelectric element is composed of multiple oscillation parts and fixing members arranged to fill multiple grooves in order to join and fix the multiple adjacent oscillation parts to each other. Therefore, according to the second aspect of the present invention, it is possible to join and fix each oscillation part in a correctly positioned state, and also improve the mechanical strength of the entire piezoelectric element.

The fixing member can be anything that can join and fix the oscillation parts to each other, such as a filler or soundproof material often used in ultrasonic transducers, for example. The fixing member may be a soundproof sheet with double-sided tape (as described in claim 3). Since the double-sided tape of the soundproof sheet can adhere to the side surface of the oscillation part, using this allows each oscillation part to be joined and fixed to each other reliably and relatively easily in a correctly positioned state. Furthermore, in this case, multiple oscillation parts may be joined and fixed to each other at equal angles of inclination with respect to a plane perpendicular to the central axis of the piezoelectric element (as described in claim 4).

The support body may be a support plate with a flat surface shape (as described in Claim but it may also be a support plate with a non-flat surface shape that is generally convex or concave and has a slope. According to this configuration, it is possible to set a different directional angle than when a piezoelectric element is supported on a support plate with a flat surface shape. In addition, the support body may be of a shape other than plate-like (e.g., rod-like or protrusion-like).

For example, the support body may include a surface shape corresponding to the pyramidal surface of a polygonal pyramid or polygonal truncated pyramid and may be a support plate that is generally convex on the outside of the support plate (as described in claim 6). In this configuration, each oscillation part can be stably supported on the support plate while being held at the desired angle, and the directional angle can be made wider than when a piezoelectric element is supported on a support plate with a flat surface shape. Alternatively, the support plate may have a surface shape corresponding to the pyramidal surface of a polygonal pyramid or polygonal truncated pyramid and may be a support plate that is generally concave on the outside of the support plate (as described in claim 7). In this configuration, each oscillation part can be stably supported on the support plate while being held at the desired angle, and the directional angle can be made narrower than when a piezoelectric element is supported on a support plate with a flat surface shape.

The eighth aspect of the present invention refers to an ultrasonic transducer for a measuring device according to any one of the first to seventh aspects of the present invention, wherein the piezoelectric element is composed of multiple oscillation parts that are divided into n parts (where n is 8 or more). Therefore, according to the eighth aspect of the present invention, since the width of each oscillation part becomes smaller, each oscillation part is more likely to oscillate in the thickness direction. In other words, by making the shape of the piezoelectric element easier to oscillate in the thickness direction, it is possible to increase the electromechanical coupling coefficient, enhance the sensitivity of the first frequency band which is the frequency band of thickness directional oscillation and widen the bandwidth.

Furthermore, when the support plate has a surface shape corresponding to the pyramidal surface of a polygonal pyramid or polygonal truncated pyramid and is generally convex or concave on the outside of the support plate, each of the multiple oscillation parts may be supported by n surfaces that form the pyramidal surface in an n-sided pyramid or n-sided truncated pyramid (as described in claim 9). In this configuration, the multiple oscillation parts divided into n parts can be stably supported on the support plate while being held at the desired angle.

The 10th aspect of the present invention refers to an ultrasonic transducer for a measuring device according to any one of the first to seventh aspects of the present invention, wherein the thickness of the oscillation part is greater than the width of the oscillation part, and the length in the radial direction of the oscillation part is three times or more than the thickness of the oscillation part. Therefore, according to the seventh aspect of the present invention, by making the oscillation part an elongated shape that is easy to oscillate in the radial direction, the electromechanical coupling coefficient increases, thus making it possible to reliably widen the range of the second frequency band, which is the frequency band of radial oscillation.

The 11th aspect of the present invention refers to an ultrasonic transducer for a measuring device according to any one of the first to seventh aspects of the present invention, wherein the oscillation part is positioned on the central side of the piezoelectric element and has a chamfered acute angle. Therefore, according to the 11th aspect of the present invention, by making the acute angle in the oscillation part a chamfered shape, the sharpness of the acute angle tip is eliminated, and chipping of the oscillation part can be prevented.

The 12th aspect of the present invention refers to an ultrasonic transducer for a measuring device according to any one of the first to seventh aspects of the present invention, wherein the support body is a support plate located on the front side of the housing container, and the multiple oscillation parts have a first surface which is an ultrasonic radiation surface and a second surface on the opposite side thereof, and the first surface is joined to the inner side of the support plate through an acoustic matching layer.

The 13th aspect of the present invention refers to an ultrasonic transducer for a measuring device according to any one of the first to seventh aspects of the present invention, wherein the support body is a support plate located on the rear side of the housing container, the multiple oscillation parts have a first surface which is an ultrasonic radiation surface and a second surface on the opposite side thereof, the second surface is joined to the inner side of the support plate through a backing material, and the first surface is molded with a filler.

Effects of the Invention

As detailed above, according to the first to 13th aspects of the present invention, it is possible to obtain an ultrasonic transducer suitable for a measurement device that can widen the frequency band suitable for the transmission and reception of ultrasonic waves. Particularly, according to the sixth and seventh aspects of the present invention, it is possible to provide a wide or narrow directivity angle.

MODES FOR CARRYING OUT THE INVENTION

First Embodiment

Below, the ultrasonic transducer for a measuring device embodying the present invention, in its first embodiment, will be described in detail based on FIGS. 1 to 6.

Figure 1:
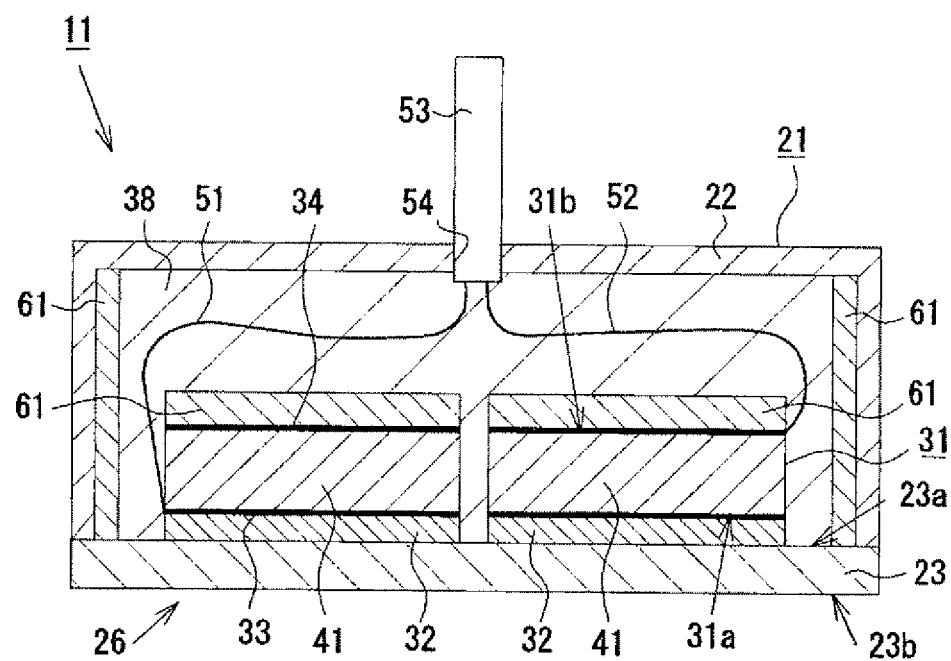
FIG. 1 is a schematic cross-sectional view showing an ultrasonic transducer of the first embodiment.
Figure 2:
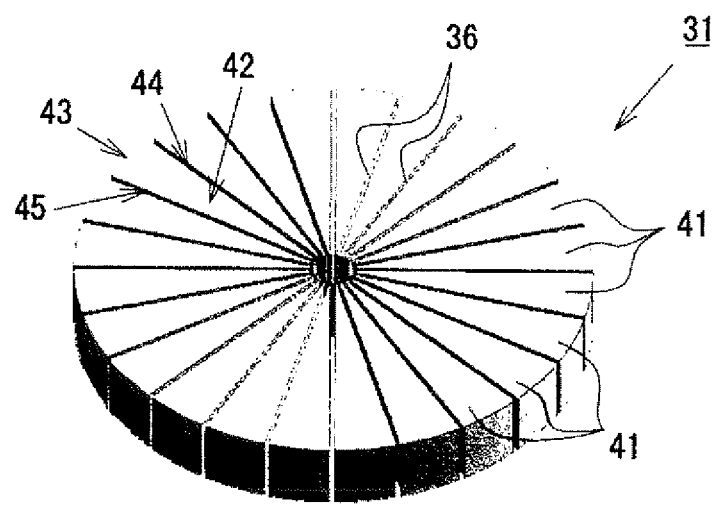
FIG. 2 is a perspective view showing a piezoelectric element in the ultrasonic transducer of the first embodiment.

As shown in FIGS. 1 and 2, the ultrasonic transducer 11 is an ultrasonic transducer for a measuring device, and in this embodiment, it is embodied as an ultrasonic transducer used in a fish finder.

Figure 3:
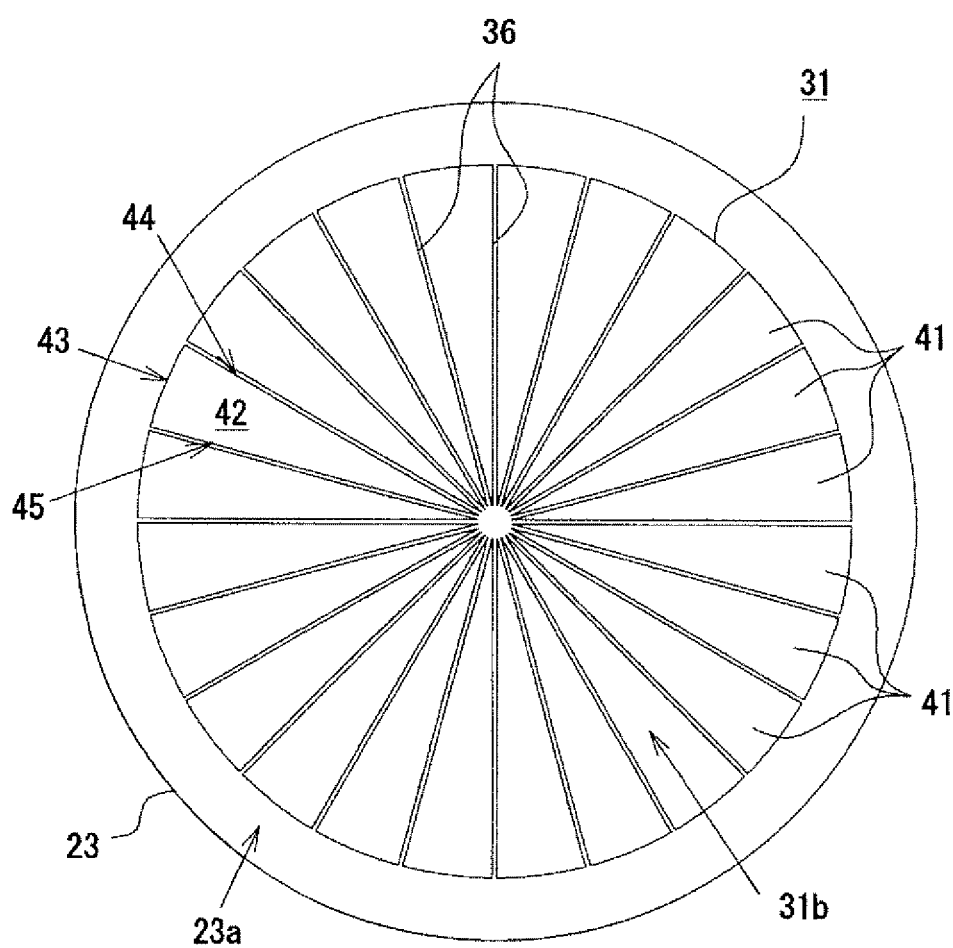
FIG. 3 is a plan view showing a state where the piezoelectric element of the first embodiment is supported on a support plate.

As shown in FIG. 1, the ultrasonic transducer 11 is equipped with a housing container 21, a piezoelectric element 31, or the like. The housing container 21 is a container for housing the piezoelectric element 31, or the like, and is composed of a container body 22 and a support plate 23. The container body 22 is formed in a bottomed cylindrical shape having an opening on the front side 26, using a resin material such as ABS resin. The support plate 23, as a support body, is closing the opening by being fixedly arranged on the front side 26 of the container body 22. As shown in FIG. 3, the support plate 23 of this embodiment is a member having the same diameter as the opening of the container body 22 and a circular shape in a plan view and especially has a flat surface shape without unevenness. The forming material of the support plate 23 is not particularly limited as long as it has the mechanical strength to support the piezoelectric element 31 and can transmit ultrasonic waves, but resin materials such as ABS resin are used, for example.

As shown in FIGS. 1 to 3, the piezoelectric element 31 is a ceramic plate-shaped body with a circular shape and is formed using, for example, lead zirconate titanate (PZT), which is a piezoelectric ceramic. The outer diameter of the piezoelectric element 31 is one size smaller than the outer diameter of the likewise circular-shaped support plate 23, thus the area of the support plate 23 is one size larger than the area of the piezoelectric element 31. The piezoelectric element 31 has a first surface 31a, which is an ultrasonic radiation surface, and a second surface 31b on the opposite side. One side surface of the acoustic matching layer 32 is joined to the first surface 31a of the piezoelectric element 31 using an adhesive, and the other side surface of the acoustic matching layer 32 is joined to the inner surface 23a side of the support plate 23 using an adhesive. In other words, the piezoelectric element 31 and the support plate 23 are joined together through the acoustic matching layer 32. A front-side electrode 33 is formed on the first surface 31a of the piezoelectric element 31, and a rear-side electrode 34 is formed on the second surface 31b of the piezoelectric element 31. Then, by applying a voltage between the front-side electrode 33 and the rear-side electrode 34, the piezoelectric element 31 is polarized in the thickness direction.

Multiple grooves 36 are formed in the piezoelectric element 31, and the oscillation part 41 is divided into multiple sections by these grooves 36. The number of divisions n of the piezoelectric element 31 is preferably eight or more, and in this embodiment, the oscillation part 41 is divided into 24 sections by 24 grooves 36 in the piezoelectric element 31. Each groove 36 is interconnected at the center of the piezoelectric element 31 and extends radially. The 24 sections of the oscillation part 41 are not connected and are completely separated from each other. And each groove 36 is arranged at equal angular intervals (in this embodiment, at 15-degree intervals) with respect to the center of the piezoelectric element 31. That is, the intersection points of each groove 36 coincide with the center. Also, the widths of each groove 36 are mutually equal.

Figure 4:
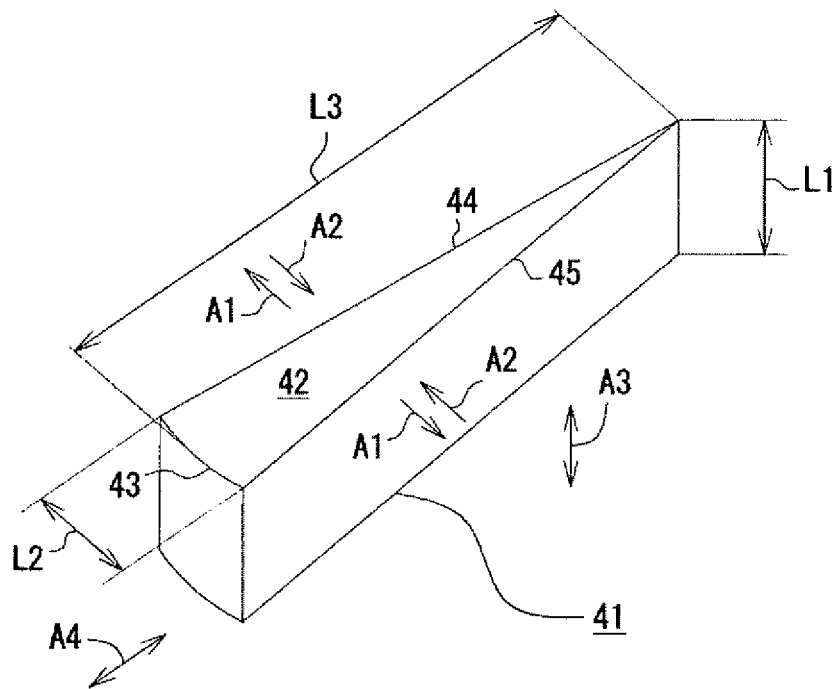
FIG. 4 is a perspective view showing an oscillation part constituting the piezoelectric element.
Figure 5:
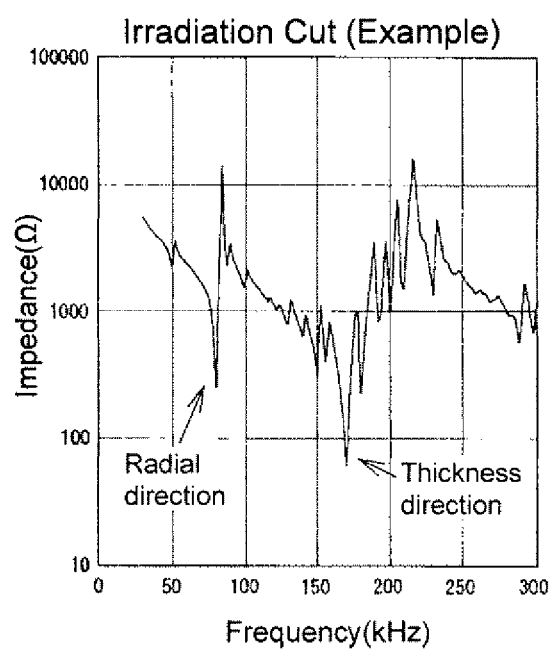
FIG. 5 is a graph showing the relationship between frequency and impedance in the Example.

Each of the oscillation parts 41 has the same size and shape, and all of them form a slender sector shape in a plan view. Specifically, as shown in FIGS. 2 to 4, the main surface 42 of the slender sector-shaped oscillation part 41 is constituted by three sides 43, 44, 45. One side 43, which is the shortest and located on the outer peripheral side of the piezoelectric element 31, is arc-shaped, and the remaining two sides 44 and 45 are of equal length and linear. Furthermore, the outer surfaces of each oscillation part 41 constitute a part of the outer peripheral surface of the piezoelectric element 31.

The thickness L1, width L2, and radial length L3 of each slender sector-shaped oscillation part 41 can be set arbitrarily without particular limitation, but it is preferable that the thickness L1 is set larger than the width L2, for example, the thickness L1 is set to be 1.1 times or more of the width L2, and more preferably within the range of 1.1 to 3.0 times. Furthermore, it is preferable that the radial length L3 is set to be at least twice the thickness L1 and width L2, and more preferably at least three times. Specifically, in this embodiment, the thickness L1 is set to be about 1.5 to 2.0 times the width L2, and the radial length L3 is set to be about 3.0 to 3.5 times the thickness L1.

As shown in FIG. 1, a conductive member, namely, a metal foil (such as copper foil, brass foil, aluminum foil, etc.), which is not illustrated, adheres to bridge multiple rear-side electrodes 34 formed on the upper main surface 42 of each oscillation part 41. The metal foil is attached to each rear-side electrode 34 by a conductive metal such as solder or a conductive adhesive that includes a conventionally known conductive filler. This metal foil functions as a common electrode on the upper main surface 42 of each oscillation part 41.

Furthermore, a first lead wire 51 of a wiring cable 53 is connected to the front-side electrode 33, and a second lead wire 52 of the wiring cable 53 is connected to the rear-side electrode 34. The first lead wire 51 is connected to a side terminal (not shown) extending outward from the front-side electrode 33 by means such as soldering. The second lead wire 52 is connected to any one of the multiple rear-side electrodes 34, also through means such as soldering. Then, the wiring cable 53 bundling the first and second lead wires 51 and 52 is led out of the housing container 21 through a cable insertion hole 54 provided in the center of the upper part of the container body 22. In addition to connecting the first lead wire 51 to the side terminal, another connection method may be adopted. For example, a metal foil (not shown) such as copper foil or the like can adhere to the upper main surface 42 of the front-side electrode 33, and the first lead wire 51 can be soldered to the metal foil.

Moreover, a sheet-like backing material 61 (soundproof material or acoustic damping material) is affixed on the second surface 31b side of the piezoelectric element 31 (that is, on the upper main surface 42 side of each oscillation part 41). The backing material 61 serves to suppress reverberation and is also affixed to the inner peripheral surface of the housing container 21. Such a backing material 61 can be a material that includes particles or fibers made of metal or ceramics in resin materials or rubber, or a material where voids are dispersedly provided in the resin material, such as urethane sponge material or the like.

Next, the operation of the ultrasonic transducer 11 will be explained.

Firstly, the power of the fish finder is turned on, and a control device (not shown) is operated to output a high-frequency signal to the ultrasonic transducer 11, causing it to oscillate. At this time, each oscillation part 41 of the piezoelectric element 31 repeats contraction and expansion in a predetermined direction. For instance, when the oscillation part 41 contracts in the thickness direction A3, it deforms so as to bulge in the width direction (that is, in the direction of arrow A1 as shown in FIG. 4). Conversely, when the oscillation part 41 extends in the thickness direction A3, it deforms so as to shrink in the width direction (that is, in the direction of arrow A2 as shown in FIG. 4). As a result, the piezoelectric element 31 oscillates, and ultrasonic waves are irradiated (transmitted) from the ultrasonic transducer 11 into the water. Then, when the ultrasonic waves reach and are reflected by a target such as a school of fish, the reflected ultrasonic waves returning are received by the ultrasonic transducer 11. The reflected ultrasonic waves received by the ultrasonic transducer 11 are converted into a received signal, input to the control device, and after undergoing predetermined signal processing, the target is visualized.

Next, an example of a method for manufacturing the ultrasonic transducer 11 will be described. Of course, it may also be possible to manufacture the ultrasonic transducer 11 by methods other than this example.

First, a disc-shaped piezoelectric element 31 with a perfectly circular shape, and a disc-shaped acoustic matching layer 32 with the same perfectly circular shape are prepared. In manufacturing the piezoelectric element 31, first, a disc-shaped ceramic sintered body composed of lead zirconate titanate (PZT) is created, and its surface is polished. Then, metal layers that will serve as the front side electrode 33 and rear-side electrode 34 are formed on both main surfaces 42, and further, a polarization process is carried out by applying a voltage to both electrodes 33 and 34. Next, the acoustic matching layer 32 is adhered to the first side 31a of the piezoelectric element 31. At this time, it is desirable to make the diameter of the disc-shaped acoustic matching layer 32 slightly smaller than the diameter of the piezoelectric element 31 so that electrical wiring can be easily taken from the adhesion surface. Next, the piezoelectric element 31 joined to acoustic matching layer 32 is set in a conventionally known cutting device and is cut into multiple pieces by performing a radial grooving process so as to pass through the center of the disk. Subsequently, each cut-out piece of the piezoelectric element (i.e., the oscillation portion 41 with the acoustic matching layer 32) is supported on the inner surface 23a side of the support plate 23. Specifically, as shown in FIG. 3, the oscillation part 41 with the acoustic matching layer 32 is arranged on the inner surface 23a of the support plate 23, separated by the groove 36. At this time, the groove 36 should be in a state where it extends radially in communication with each other at the central part of the piezoelectric element 31 and the support plate 23. In this arrangement state, each oscillation part 41 is adhered and fixed to the inner surface 23a of the support plate 23 through the acoustic matching layer 32. Then, the first and second lead wires 51 and 52 are respectively soldered to the front-side electrode 33 and the rea-side electrode 34 of the piezoelectric element 31. The wiring cable 53 is then drawn out of the housing container 21 through a cable insertion hole 54, and the support plate 23 is positioned and fixed on the front side 26 of the container body 22. As a result, the opening of container body 22 is closed, and the piezoelectric element 31 is housed in the space inside the housing container 21. After this, filler 38 is filled into the housing container 21 through a hole (not shown) provided in the housing container 21, and the space inside is filled with the filler 38 and integrally molded. In this way, the ultrasonic transducer 11 is completely manufactured.

Therefore, according to this embodiment, the following effects can be obtained.

(1) According to the ultrasonic transducer 11 of this embodiment, since the piezoelectric element 31 is composed of multiple oscillation parts 41 divided by the groove 36, each oscillation part 41 is easily deformed in the thickness direction A3. As a result, the piezoelectric element 31 oscillates in the thickness direction A3 over the entire region, thus increasing the electromechanical coupling coefficient. Therefore, the transmission/reception sensitivity in the first frequency band, which is the frequency band of thickness directional oscillation, increases, and the range of the first frequency band also widens. In addition, each oscillation part 41 constituting the piezoelectric element 31 is in a slender sector shape, so when driven at the resonance frequency of radial oscillation, the end of the central part of the oscillation part 41, that is, the central part of the circular ultrasonic transducer 11 oscillates with a large amplitude. As a result, the transmission/reception sensitivity in the second frequency band, which is the frequency band of radial direction oscillation of the oscillation part 41, increases. From the above, it is possible to transmit and receive with high sensitivity in both the thickness directional oscillation and the radial oscillation.

(2) According to the embodiment of the present invention, the piezoelectric element 31 does not only oscillate in the thickness direction A3 of the first frequency band but also oscillates in a frequency band that is different from the first frequency band, specifically in the radial direction A4 in the second frequency band, which is lower than the first frequency band. Therefore, driving the ultrasonic transducer 11 and switching between the first frequency band (e.g., around 200 kHz) that oscillates in the thickness direction A3 and the second frequency band (e.g., around 50 kHz) that oscillates in the radial direction A4, makes it possible to transmit and receive ultrasonic waves in each frequency band. Furthermore, installing only one ultrasonic transducer 11 in a fish finder makes it possible to transmit and receive ultrasonic waves in two different frequency bands, thus making it possible to manufacture a lighter, smaller, and more cost-effective device.

When driving the ultrasonic transducer 11 in the second frequency band (low-frequency drive), deep detection can be done as it attenuates less compared to high frequencies, and it features a wide directional angle. However, the resolution of the received signals (reflected waves) decreases. On the other hand, when driving the ultrasonic transducer 11 in the first frequency band (high-frequency drive), the attenuation is larger, and the detection depth becomes shallow, but high-resolution detection with a narrow directional angle can be done. Thus, being able to switch frequencies and drive with a single ultrasonic transducer 11 allows for detection selection depending on the situation.

(3) The piezoelectric element 31 in this embodiment consists of 24 equally divided oscillation parts 41 of the same size and shape. Therefore, since the width L2 of each oscillation part 41 becomes smaller, each oscillation part 41 is more likely to oscillate in the thickness direction A3. That is, by making the piezoelectric element 31 oscillate easily in the thickness direction A3, it is possible to increase the electromechanical coupling coefficient, enhance the sensitivity in the frequency band of the thickness directional oscillation, which is the first frequency band, and widen the bandwidth.

(4) According to the embodiment of the present invention, the thickness L1 of the oscillation part 41 is larger than the width L2, and the radial length L3 is more than three times the thickness L1. Therefore, by making the oscillation part 41 a slender shape that is easy to oscillate in the radial direction A4, the electromechanical coupling coefficient can be increased, and the range of the second frequency band, which is the frequency band of the radial oscillation, can be reliably expanded.

[Evaluation of Ultrasonic Transducer]

Next, the evaluation method and results of the ultrasonic transducer 11 will be described.

Here, with respect to the piezoelectric element 31 of this embodiment (outer diameter: thickness: 7.2 mm), the impedance of the oscillation part 41 was measured. Specifically, for the measurement sample, we used an impedance analyzer to perform measurements while sweeping the frequency between 30 kHz and 300 kHz. As a result, the resonance area (the valley area) of the radial oscillation of the oscillation part 41 was confirmed to be around 70 kHz, and the resonance area of the thickness directional oscillation of the oscillation part 41 was confirmed to be around 170 kHz (refer to FIG. 5). Therefore, in this measurement sample, it was confirmed that the oscillation part 41 oscillates radially at a frequency lower than the frequency at which it oscillates in the thickness direction A3. Also, it was confirmed that the displacement amount in radial oscillation increases as it goes to both ends (center and outer periphery) of the oscillation part 41, and the displacement amount in the thickness directional oscillation increases as it goes to the surface side and the rear side of the middle part.

Next, in addition to the piezoelectric element 31 of this embodiment (outer diameter thickness 7.2 mm), two different types of piezoelectric element 31 were produced. For one of the two piezoelectric elements, multiple belt-shaped oscillation parts were formed by creating several grooves 36 extending in one direction on the piezoelectric element 31, which has a circular outer shape. The other one was a piezoelectric element 31 with a circular outer shape that did not form any grooves 36. Then, ultrasonic transducers 11 were prototyped using these piezoelectric elements 31 (refer to FIG. 6). Specifically, the ultrasonic transducer 11 composed using the piezoelectric element 31 of this embodiment, which has a slender, sector-shaped oscillation part 41, was designated as Sample 1 (Example). The ultrasonic transducer 11 composed using the piezoelectric element 31, which has a belt-shaped oscillation part, was designated as Sample 2 (Comparative Example 1). The ultrasonic transducer 11 composed using the undivided piezoelectric element 31 was designated as Sample 3 (Comparative Example 2)

Figure 6:
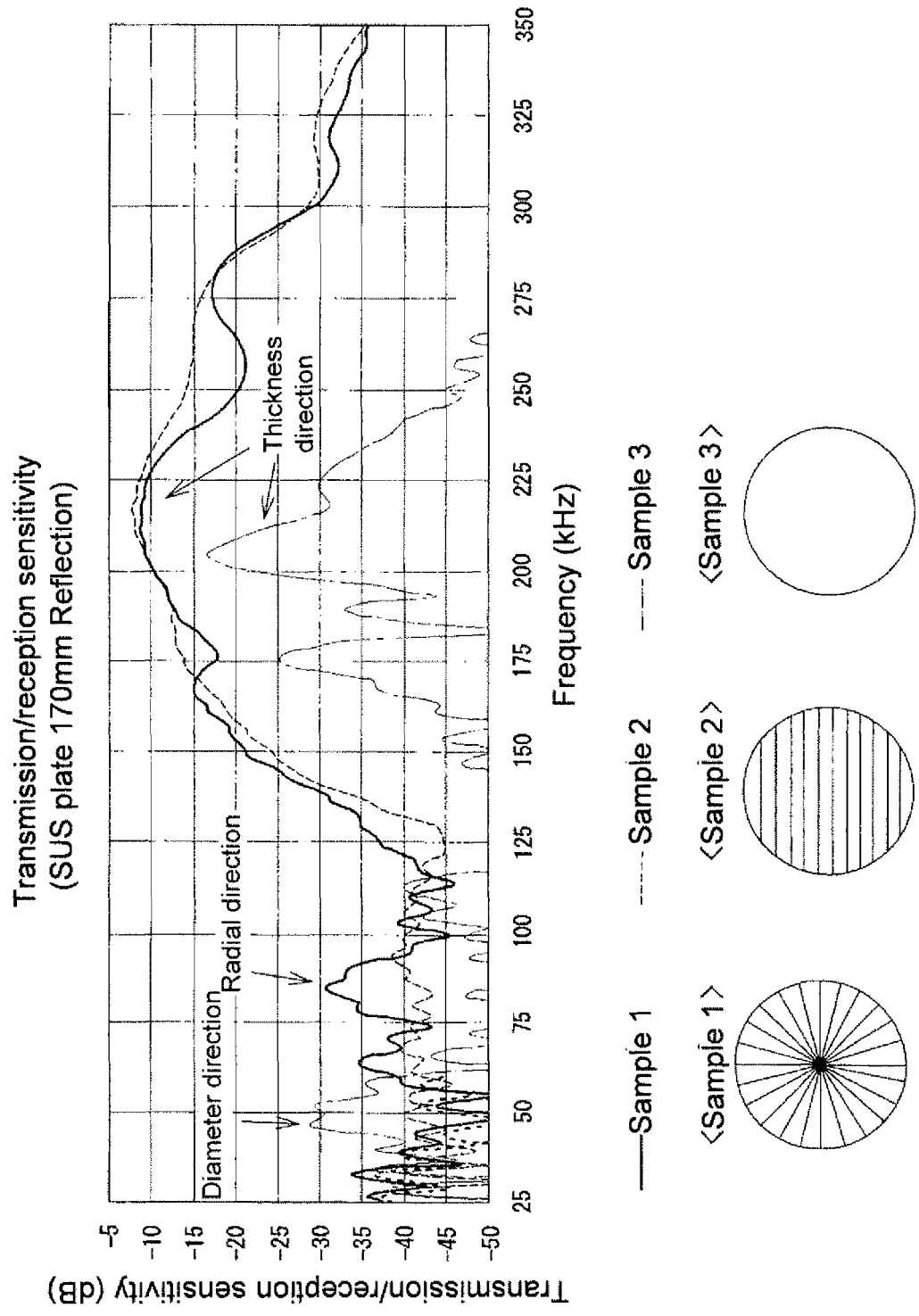
FIG. 6 is a graph showing the relationship between frequency and transmission/reception sensitivity in the Example and Comparative Examples 1 and 2.

Then, the transmission/reception sensitivities of the ultrasonic transducer 11 were calculated for these measurement samples (Samples 1 to 3). Specifically, the ultrasonic radiation surface of the ultrasonic transducer 11 was immersed in water, and ultrasonic waves were vertically irradiated to a SUS plate located 170 mm away from the ultrasonic radiation surface. The ultrasonic waves reflected (reflected waves) at the SUS plate are received by the ultrasonic transducer 11 which generates a voltage signal at both ends. At this time, the voltage amplitude at the time of transmission and reception of the ultrasonic transducer 11 was measured by an oscilloscope, and by performing both frequency component analysis and calculation of the transmission voltage waveform and the reception voltage waveform, the transmission/reception sensitivity was calculated. Also, the transmission/reception sensitivity is a ratio of the amplitude Vr of the received voltage to the amplitude Vs of the transmitted voltage and is calculated from the formula 20×log (Vr/Vs). The graph in FIG. 6 shows the relationship between frequency and transmission/reception sensitivity in Samples 1 to 3.

As a result, it was confirmed that Sample 1 (Example) oscillates in the thickness direction in the first frequency band where the transmission/reception sensitivity peaks at 210 kHz and oscillates in the radial direction of the oscillation part in the second frequency band where the transmission/reception sensitivity peaks at 80 kHz, which is lower than the first frequency band. The range where the transmission/reception sensitivity becomes, for example, −33 dB or more was confirmed to be around 135 kHz to 325 kHz in the first frequency band, and around 80 kHz to 90 kHz in the second frequency band. From the above, it was confirmed that Sample 1 is suitable for both the first frequency band and the second frequency for ultrasonic transmission and reception. Furthermore, when the groove 36 is formed radially, it was confirmed that Sample 1 becomes an ultrasonic transducer with a wide band around 200 kHz and with a narrow band around 80 kHz.

On the other hand, it was confirmed that Sample 2 (Comparative Example 1) oscillates in the thickness direction at the frequency band where the transmission/reception sensitivity peaks at 220 kHz. It was also confirmed that the range where the transmission/reception sensitivity becomes −33 dB or higher is around 140 kHz to 340 kHz in the frequency band that peaks at 220 kHz. In Sample 2, no peak was observed in the radial oscillation. As such, in Sample 2, which is Comparative Example 1, although it has a wide band in the thickness directional oscillation, it was confirmed that the transmission/reception sensitivity due to the longitudinal oscillation of the notch (groove) is weak. In contrast, in Sample 1, which is the Example, in addition to having the same transmission/reception sensitivity and band characteristics in the thickness direction as Sample 2, it was confirmed that low-frequency transmission/reception is also possible due to the radial oscillation of the oscillation part 41.

In Sample 3 (Comparative Example 2), it was confirmed that it oscillates in the thickness direction at a frequency band where the transmission/reception sensitivity peaks at 205 kHz, and in the radial direction (diameter direction) at a frequency band where the transmission/reception sensitivity peaks at 50 kHz. The range where the transmission/reception sensitivity is, for example, −33 dB or higher was confirmed to be around 195 kHz to 230 kHz for the first frequency band, and around 45 kHz to 55 kHz for the second frequency band. Sample 3 which is Comparative Example 2 is widely recognized in the market as a transducer for fish finders that switch between two frequencies, 50 kHz and 200 kHz. On the other hand, it was found that Sample 1 as the Example is capable of being used in both frequency bands, like Sample 3, due to the higher sensitivity and wider bandwidth of the thickness directional oscillation around 200 kHz than Sample 3, in addition to the fact that the sensitivity of low-frequency radial oscillation transmission/reception can be obtained at the same sensitivity as Sample 3.

Second Embodiment

Hereafter, the ultrasonic transducer 11A, which embodies the second embodiment of the present invention, will be described based on FIGS. 7 to 10. This section will mainly explain the parts that differ from the first embodiment, and for the parts in common, the same reference numbers will be used, and a detailed explanation will be omitted.

Figure 7:
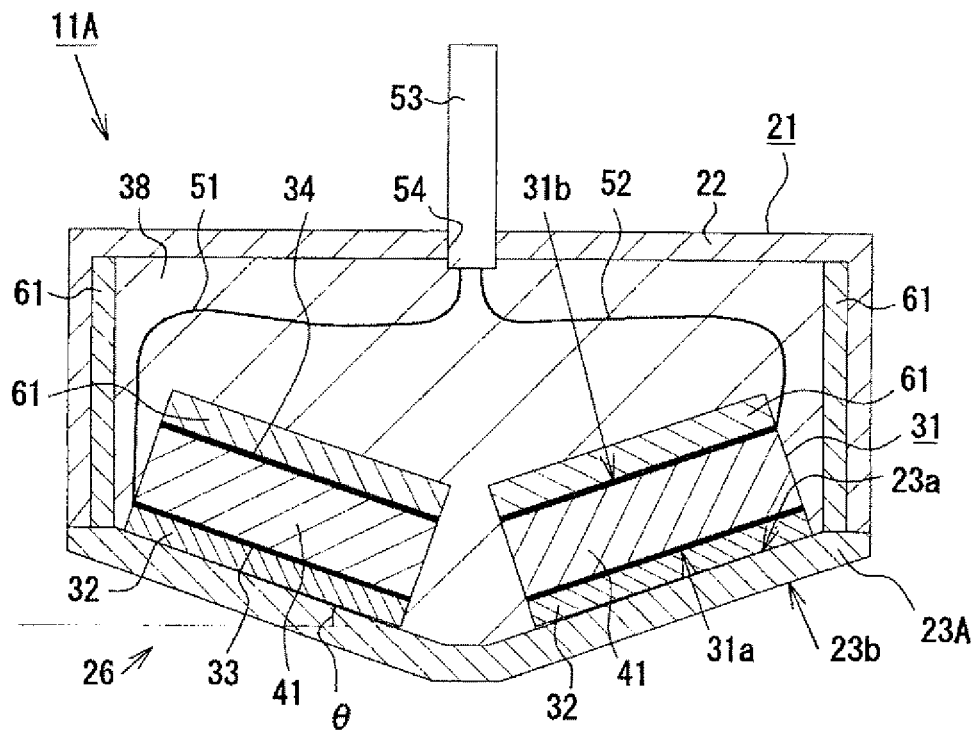
FIG. 7 is a schematic cross-sectional view showing an ultrasonic transducer of the second embodiment.
Figure 8:
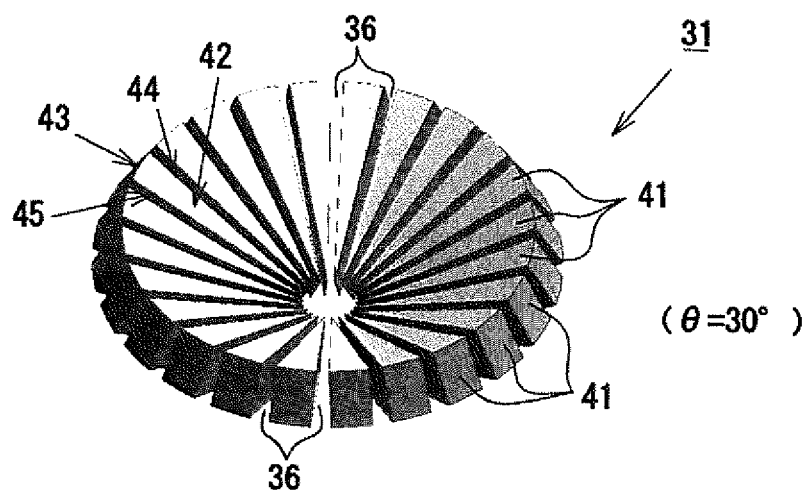
FIG. 8 is a perspective view showing a piezoelectric element in the ultrasonic transducer of the second embodiment.
Figure 9:
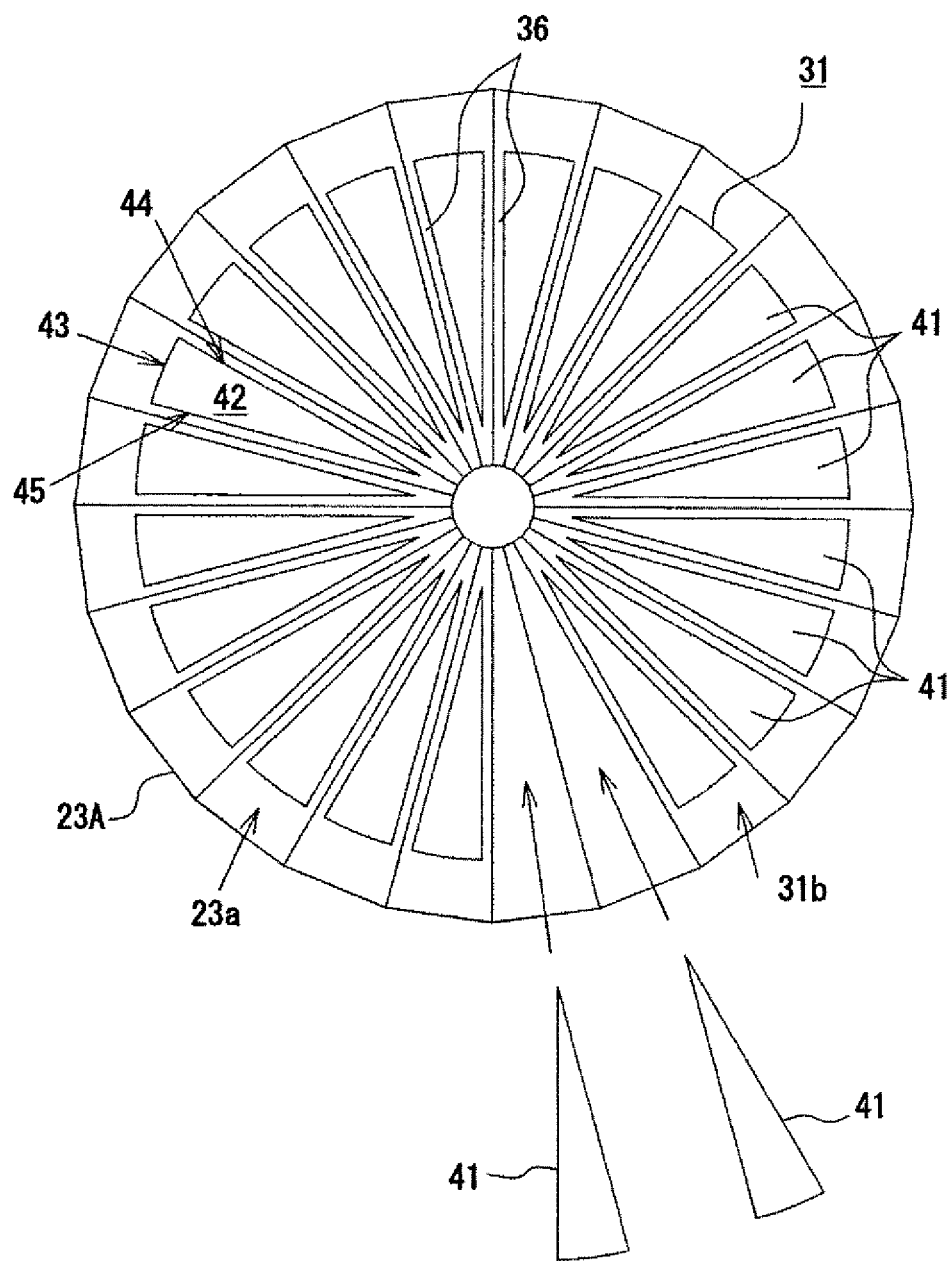
FIG. 9 is a plan view showing a situation when the piezoelectric element of the second embodiment is supported on a support plate.
Figure 10:
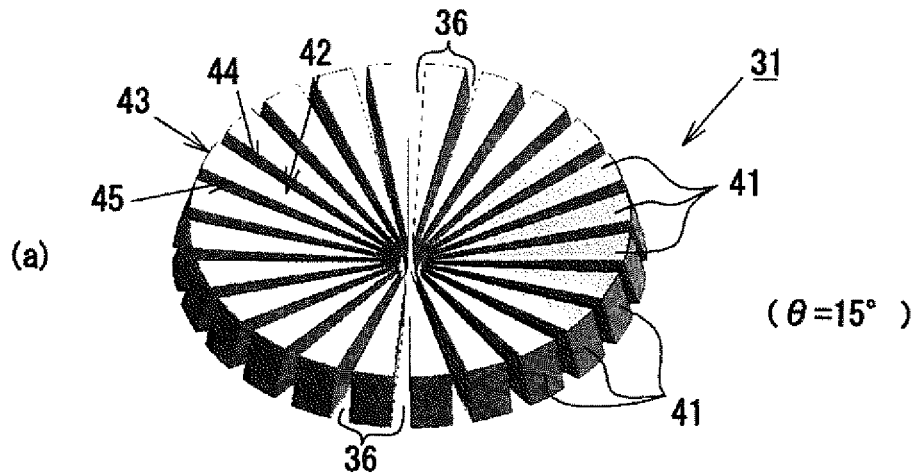
FIGS. 10(a), (b) and (c) are perspective views showing a deformation example of the piezoelectric element in the second embodiment.
Figure 10:
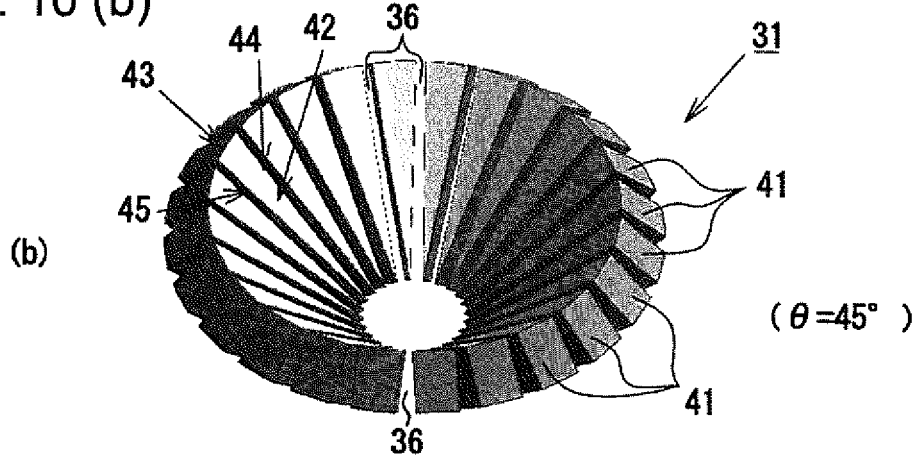
Figure 10:
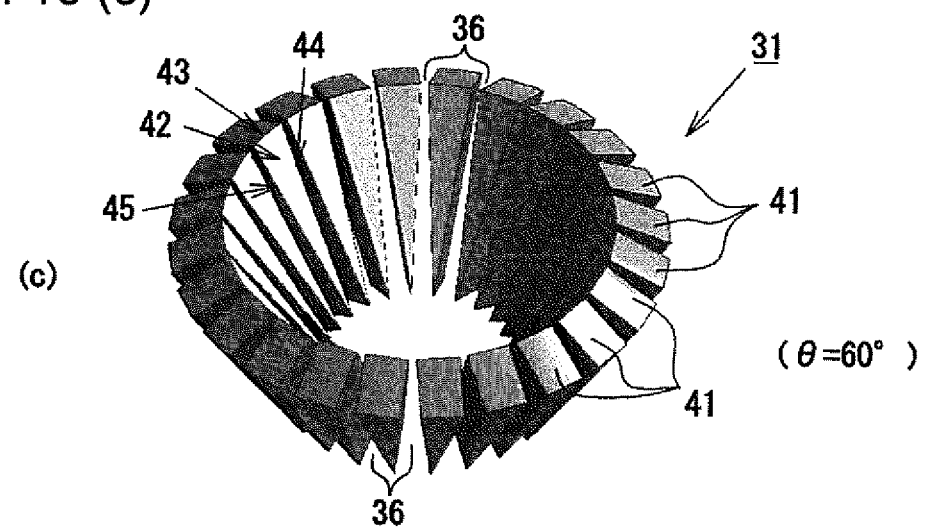

As shown in FIG. 7, the ultrasonic transducer 11A of the second embodiment differs from the first embodiment in the configuration of the support plate 23A. That is, while the support plate 23 of the first embodiment has a flat surface shape, the support plate 23A of this embodiment has a non-flat surface shape. Specifically, the support plate 23A has a surface shape corresponding to the conical surface of a 24-sided truncated pyramid and is generally convex on the outer surface 23b side and generally concave on the inner surface 23a side. In other words, in the case of the support plate 23A, the conical surface of the truncated pyramid has the same number of constituent surfaces as the number of divisions n of the piezoelectric element 31, that is, 24 (See FIG. 9). Each of the 24 constituent surfaces is substantially sector-shaped (with the acute angle part being chamfered). On the opposite side of each constituent surface (more precisely, the inner surface of the support plate 23A), an oscillation part 41, which is one size smaller, is adhered and fixed one by one through the acoustic matching layer 32. Here, the angle formed by the inner surface 23a of the support plate 23A, which is the oscillation part supporting surface, with respect to a plane perpendicular to the central axis of the ultrasonic transducer 11A, is defined as the inclination angle θ. The inclination angle θ can be arbitrarily set and is not particularly limited, but it is preferably set to about 5 to 60 degrees, more preferably about 10 to 60 degrees. In this embodiment, since the inclination angle θ of the inner surface 23a of the support plate 23A is 30°, each oscillation part 41 is also supported on the inner surface 23a of the support plate 23A at an angle of 30 degrees with respect to the plane perpendicular to the central axis. In FIG. 8, the piezoelectric element 31 is shown in a state where each oscillation part 41 is arranged at an inclination angle θ=30 degrees. As a separate modification example, FIG. 10(a) shows the piezoelectric element 31 in a state where the oscillation part 41 is arranged at an inclination angle θ=15 degrees, FIG. 10(b) shows the piezoelectric element 31 in a state where the oscillation part 41 is arranged at an inclination angle θ=45 degrees, and FIG. 10(c) shows the piezoelectric element 31 in a state where the oscillation part 41 is arranged at an inclination angle θ=60 degrees, respectively.

According to the second embodiment configured as described above, in addition to the effects of the first embodiment, the following effects can be achieved. That is, the support surface of the support plate 23A has a surface shape corresponding to the conical surface of a truncated pyramid, and the outer surface side of the support plate 23A is generally convex. With this configuration, each oscillation part 41 can be stably supported on the support plate 23A while being held at a desired angle (in this case, 30 degrees). Furthermore, compared to when the piezoelectric element 31 is supported by the support plate 23 having a flat surface shape, it is possible to widen the directivity angle. By the way, it is also conceivable to select a support plate having a curved surface shape corresponding to the conical surface of a cone or truncated cone as the support surface and to adopt each oscillation part 41 for this. However, with this configuration, it would be necessary to adhere each oscillation part 41 to the curved surface, which makes it difficult to stably support each oscillation part 41 on the support plate, and clearance is likely to form between the support plate and the oscillation part 41. Also, it becomes more difficult to position each oscillation part 41 relative to the support plate. In that regard, the support plate 23A of this embodiment is preferable since it is less likely to cause the above problems.

Third Embodiment

Next, the third embodiment which embodies the present invention will be explained based on FIGS. 11 and 12. This section will mainly describe the points where the third embodiment differs from the first and second embodiments, and for the parts in common, the same reference numbers will be used, and a detailed explanation will be omitted.

Figure 11:
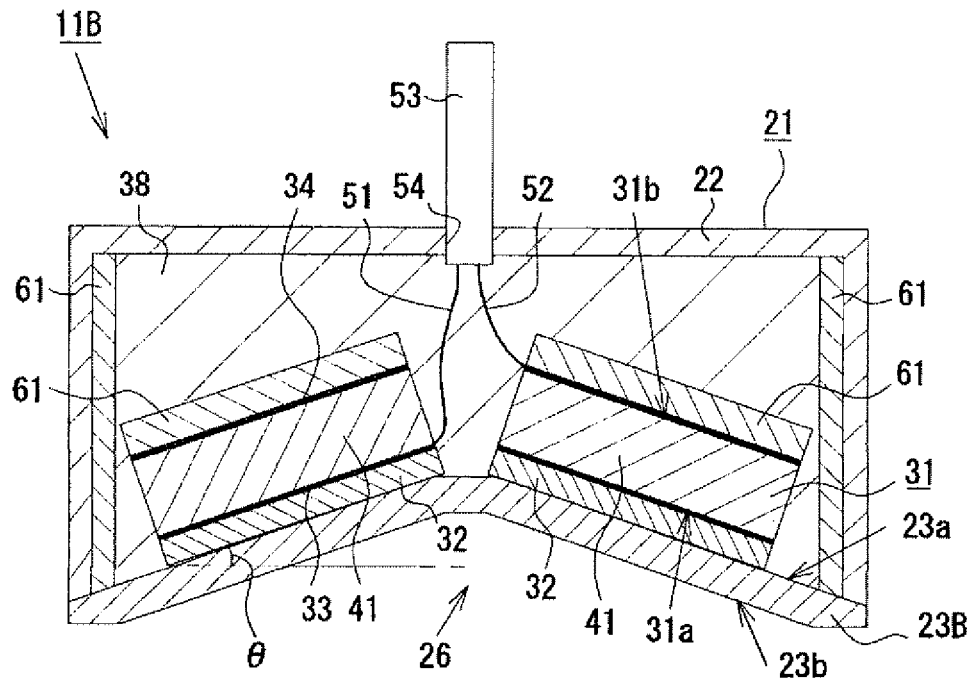
FIG. 11 is a schematic cross-sectional view showing an ultrasonic transducer of the third embodiment.
Figure 12:
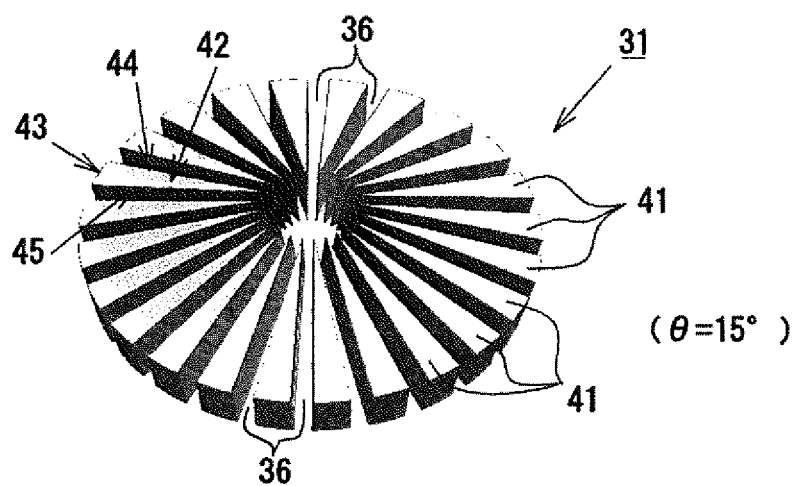
FIG. 12 is a perspective view showing a piezoelectric element in the ultrasonic transducer of the third embodiment.

As shown in FIG. 11, in the ultrasonic transducer 11B of the third embodiment, the support plate 23B is generally concave on the outer surface 23b side and generally convex on the inner surface 23a side, which is different from the support plate 23A of the second embodiment. This support plate 23B has the same number of constituent surfaces (i.e., 24 facets) as the number of divisions n of the piezoelectric element 31, which are equivalent to the pyramid faces of a multi-angular truncated pyramid. Each of these constituent surfaces has a slightly smaller oscillation part 41 adhered and fixed to it, one by one, through an acoustic matching layer 32. Furthermore, the inclination angle θ of the support plate 23B can be set arbitrarily and is not particularly limited, but it is set, for example, to about 5 to 60 degrees, and in this embodiment, it is set to 15 degrees. FIG. 12 shows the piezoelectric element 31 in which each oscillation part 41 is arranged at an inclination angle θ of 15 degrees. For instance, it can be set to approximately 5 to 60 degrees, and preferably, it is set to about 10 to 60 degrees. In this embodiment, since the inclination angle θ of the inner surface 23a of the support plate 23A is 15 degrees, each oscillation part 41 is supported on the inner surface 23a of the support plate 23A at an angle of 15 degrees with respect to the plane perpendicular to the central axis. FIG. 12 shows the piezoelectric element 31 in which each oscillation part 41 is arranged at an inclination angle θ of 15 degrees.

According to the third embodiment configured in this way, in addition to the effects of the first embodiment, the following effects can also be achieved. That is, the supporting surface of support plate 23B has a shape corresponding to the pyramid surface of a multi-angular truncated pyramid, and the outer surface 23b side of the support plate 23B is generally concave. With this configuration, each oscillation part 41 can be stably supported on the support plate 23B in a state where it is held at a desired angle (in this case, 15 degrees). Furthermore, compared to when the piezoelectric element 31 is supported by the support plate 23 with a flat surface shape, the directional angle can be narrowed. Also, as in the second embodiment, there can be no clearance between the support plate and the oscillation part 41, and the positioning of each oscillation part 41 with respect to the support plate can be easily done.

The above embodiments may be modified as follows.

Figure 13A:
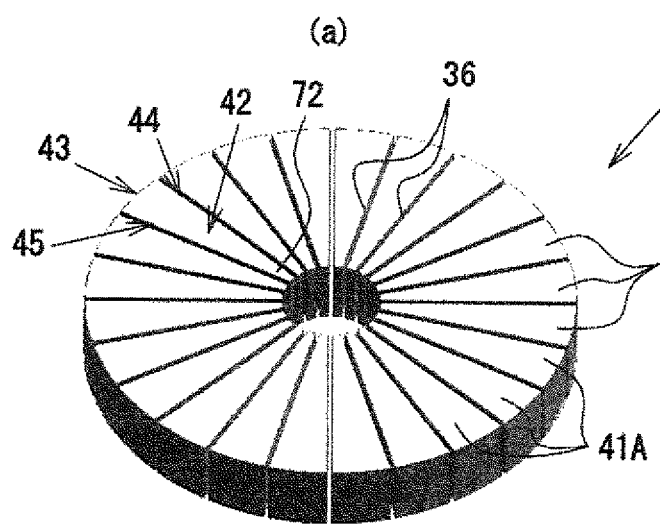
FIG. 13(a) is a perspective view showing an ultrasonic transducer in another embodiment.
Figure 13B:
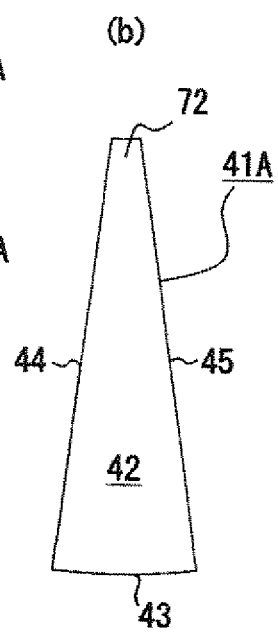
FIG. 13(b) is a plan view of its oscillation part.

For example, the piezoelectric element may also be a substantially sector-shaped piezoelectric element 31A as shown in FIGS. 13(a) and (b). This piezoelectric element 31A is substantially annular with a circular through hole 71 at the center, and the inner wall of the circular through hole 71 constitutes the end face on the central side of each oscillation part 41A. According to this configuration, the acute angle portion 72 arranged on the central side of the piezoelectric element 31A in each oscillation part 41A becomes a chamfered shape. Therefore, the sharpness of the acute angle tip in each oscillation part 41A is eliminated, and the chipping of each oscillation part 41 can be prevented. Thus, the piezoelectric element 31A can be made highly durable.

Figure 14:
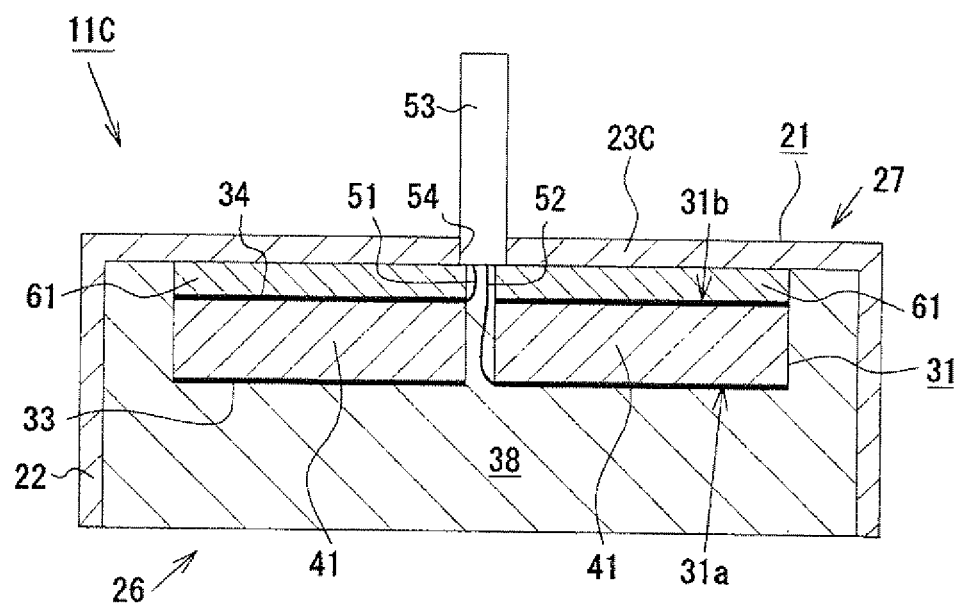
FIG. 14 is a schematic cross-sectional view showing an ultrasonic transducer in another embodiment.

In the above embodiments, each oscillation part 41 is supported and fixed to the support plate 23, 23A, 23B located on the front side 26 of the housing container 21, but it is not limited. For example, each oscillation part 41 may be supported and fixed to a support plate 23C located on the rear side 27 of the housing container 21, as in the ultrasonic transducer 11C of another embodiment shown in FIG. 14. In this ultrasonic transducer 11B, the support plate 23C has a flat surface shape, and the second surface 31b of each oscillation part 41 is joined to the inner side of the support plate 23C using an adhesive through the backing material 61. On the other hand, the side of the first surface 31a, which is the ultrasonic radiation surface, is molded with filler 38. The filler 38 is filled to be flush with the opening of the housing container 21. The support plate 23C located on the rear side 27 of the housing container 21 may have a surface shape corresponding to the pyramidal surface of a polygonal pyramid or polygonal truncated pyramid and may be convex or concave generally on the outer surface side. Then, the second surface 31b of each oscillation part 41 may be supported on the inner surface of such a tilted support plate 23C.

The ultrasonic transducers 11, 11A, 11B, and 11C in the above embodiments are configured using piezoelectric elements 31 with a circular (perfect circle) shape, but it is not limited to this. The piezoelectric elements can also have an elliptical shape or an oval shape.

In the above embodiments, 24 oscillation parts 41 (with a central angle of 15 degrees) are arranged and fixed through the groove 36 in the piezoelectric elements 31, 31A. However, piezoelectric elements 31 and 31A may have 25 or more oscillation parts 41 (e.g., 36, or the like) arranged through the groove 36, or they may have 23 oscillation parts 41 or less than that (e.g., 16, 12, 10, 8, or the like). Furthermore, while in the above embodiments, piezoelectric elements 31 and 31A have oscillation parts 41 of the same central angle (15 degrees), piezoelectric elements 31 and 31A may have multiple types of oscillation parts 41 with different central angles.

In the above embodiments of the ultrasonic transducers 11, 11A, 11B, and 11C, the groove 36 between each oscillation part 41 was generally a void, but a filler 38 (fixing member) can be arranged to fill this void. When using the filler 38, adjacent oscillation parts 41 can be joined and fixed to each other by the hardened filler 38. In this case, the specific gravity of the filler 38 is not particularly limited, but it is preferably 1.5 or less. By doing so, since the filler 38 becomes relatively light, it is less likely to become a load during the oscillation of the oscillation part 41. As a result, it is possible to prevent a decrease in transmission/reception sensitivity due to the use of the filler 38.

Figure 15:
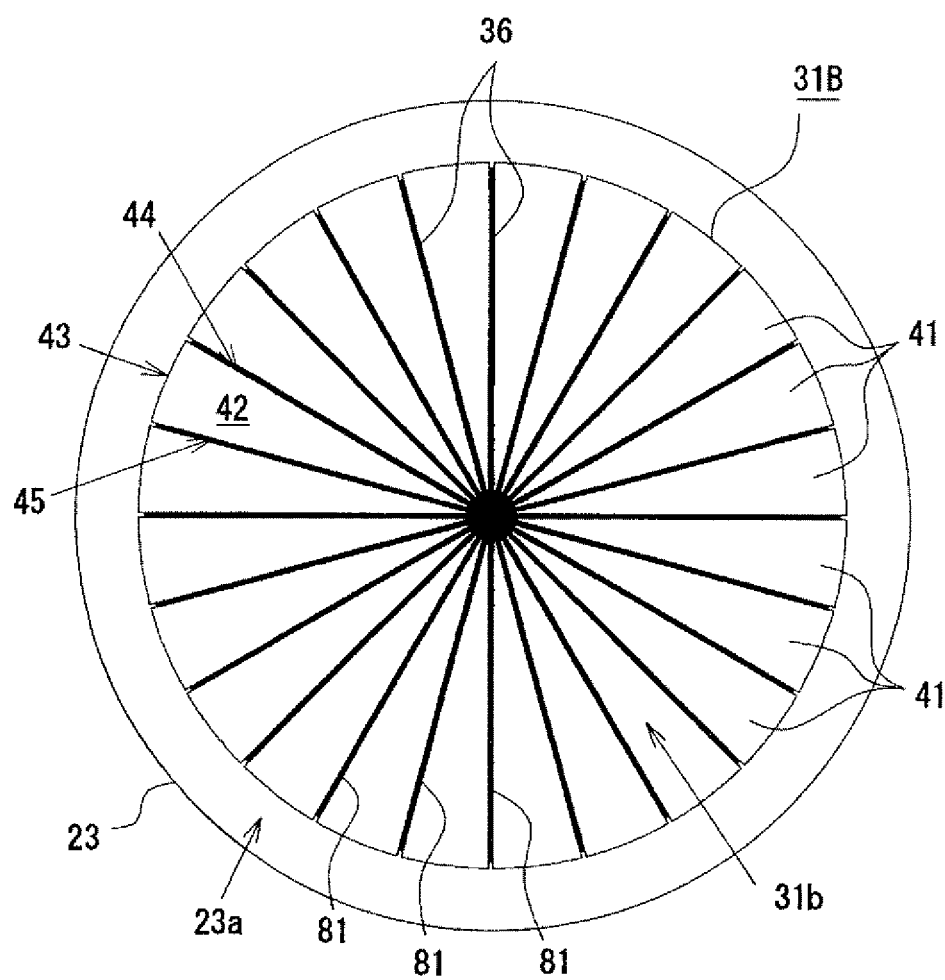
FIG. 15 is a plan view showing a state where a piezoelectric element with a tape-sticking structure is supported on a support plate in another embodiment.
Figure 16:
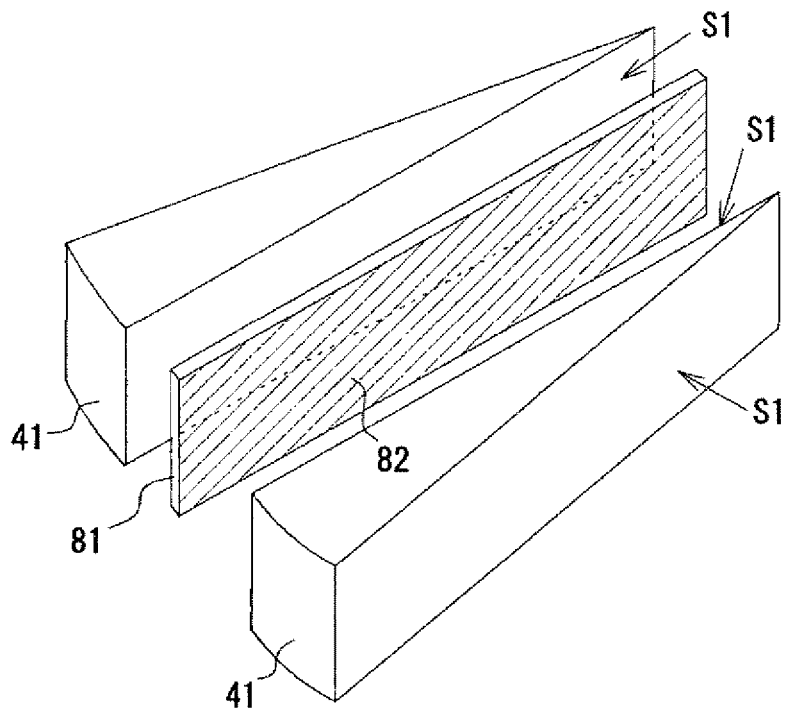
FIG. 16 is a perspective view showing a state where a soundproof sheet is arranged between the oscillation parts in the piezoelectric element of FIG. 15.
Figure 17:
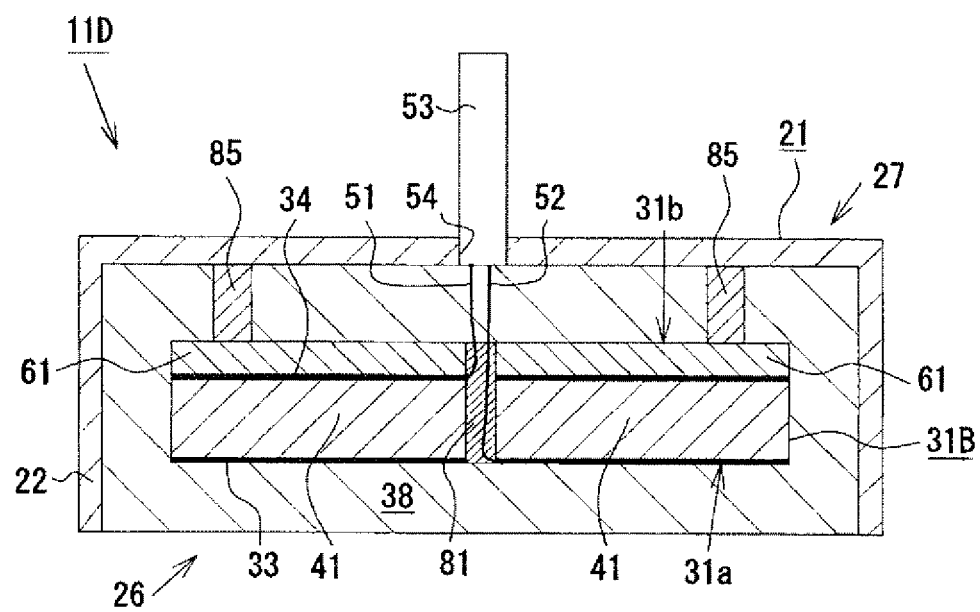
FIG. 17 is a schematic cross-sectional view showing an ultrasonic transducer equipped with a piezoelectric element with a tape-sticking structure in another embodiment.
Figure 18:
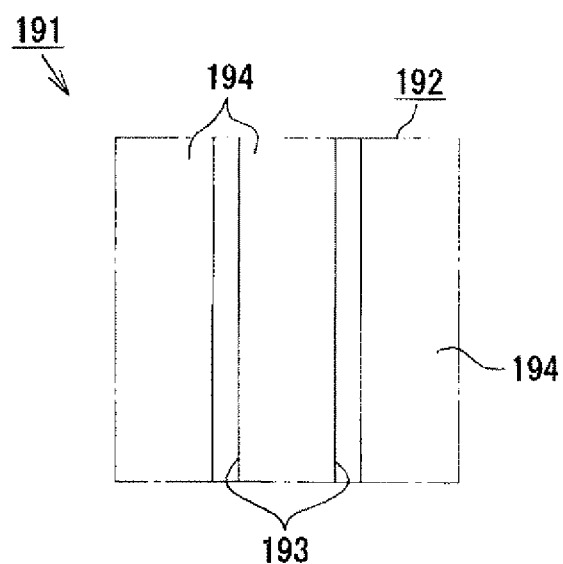
FIG. 18 is a major part plan view showing a piezoelectric element in conventional art.
Figure 19:
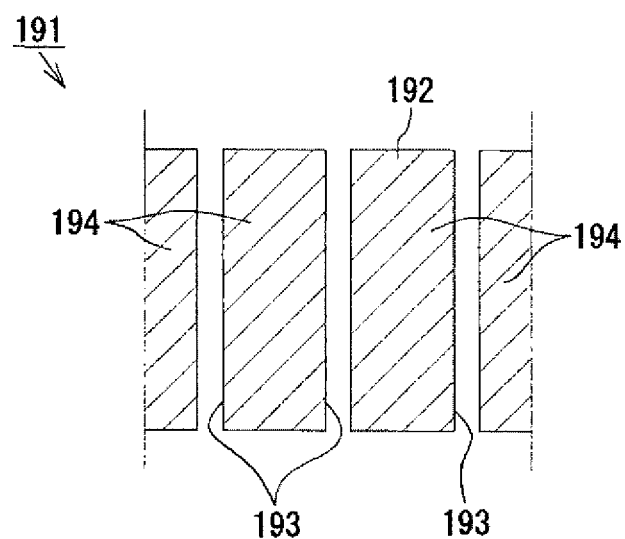
FIG. 19 is a sectional view showing an oscillation part in conventional art.

In the void of the groove 36 between each oscillation parts 41, a soundproof material such as a sponge can be arranged as a fixing member instead of the above-mentioned filler 38. Specifically, as in the piezoelectric element 31B of the ultrasonic transducer 11D in another embodiment shown in FIGS. 15 to 17, a soundproof material sheet 81 with double-sided tape 82 can be arranged. It is preferable that the double-sided tape 82 is provided on both sides of the soundproof material sheet 81 (see FIG. 16). Since the double-sided tape 82 of the soundproof material sheet 81 can adhere to the side S1 of the oscillation part 41, when this is used, each oscillation part 41 can be reliably and relatively easily joined and fixed in a state where each is correctly positioned. The piezoelectric element 31B with the above tape-adhering structure may be supported and fixed on the support plates 23, 23A, 23B, 23C as in the above embodiments, but it is not necessarily so. For example, a housing container 21 with support bodies 85 in the form of rods or projections provided at multiple places on the inner wall can be used. At this time, the piezoelectric element 31B with the tape-adhering structure can be housed in this housing container 21 and its posture determined by supporting it at the tips of the support bodies 85, and then molded with the filler 38 (see FIG. 17). Also, the multiple oscillation parts 41 are joined and fixed to each other at an equal inclination angle θ relative to a plane perpendicular to the central axis of the piezoelectric element 31B. For example, if a soundproof material sheet 81 of uniform thickness is used (in other words, the two side surfaces S1 are parallel), as shown in FIG. 16, a piezoelectric element 31B can be constituted in which each oscillation part 41 is arranged in a flat state with the bottom surfaces located within a single plane (that is, inclination angle=0°). If a soundproof material sheet 81 with uneven thickness in the vertical direction is used, each oscillation part 41 can be arranged in an inclined manner. To be more specific, for example, if a soundproof material sheet 81 is used, in which the thickness increases as it goes downwards, each oscillation part 41 can be arranged at an incline with the center of the piezoelectric element 31B protruding towards the first surface 31a side. Conversely, if a soundproof material sheet 81 is used, in which the thickness decreases as it goes downwards, each oscillation part 41 can be arranged at an incline with the center of the piezoelectric element 31B being concave towards the first surface 31a side.

In each of the above-mentioned embodiments of the ultrasonic transducers 11, 11A, 11B, 11C, 11D, piezoelectric elements 31, 31A, 31B made from lead zirconate titanate (PZT) are used, but the formation material for piezoelectric elements 31, 31A is not particularly limited. For example, piezoelectric elements made from ceramics such as potassium sodium niobate (alkali niobate), barium titanate, PMN- PT (Pb (Mg$_{1/3}$Nb$_{2/3}$)O$_3$—PbTiO$_3$) single crystal, PZNT (Pb (Zn$_{1/3}$Nb$_{2/3}$)O$_3$—PbTiO$_3$) single crystal, or LiNbO$_3$ single crystal can also be used.

In each of the above-mentioned embodiments, examples are given by using ultrasonic transducers 11, 11A, 11B, 11C, and 11D for fish finders, but it is not limited to this to such applications, and they may also be used in other measuring devices. For instance, the ultrasonic transducer 11 could be used in a sonar where the irradiation direction of ultrasonic waves can be electrically or mechanically altered. Furthermore, it could be used in measuring devices such as echo sounders for measuring the depth of water, or air sensors used to measure distances in air.

DESCRIPTION OF THE REFERENCE NUMERALS 11, 11A, 11B, 11C, 11D: Ultrasonic transducer for a measuring device
21: Housing container
23, 23A, 23B, 23C: Support plate as the support body
23*a*: Inner surface (of the support plate)
23*b*: Outer surface (of the support plate)
26: Front surface side (of the housing container)
27: Rear-side surface (of the housing container)
31, 31A, 31B: Piezoelectric element
31*a*: First surface
31*b*: Second surface
32: Acoustic matching layer
36: Groove
38: Filler
41, 41A: Oscillation part
61: Backing material
72: Acute angle part
81: Soundproof sheet as the fixing member
82: Double-sided tape
85: Support body
A3: Thickness direction
A4: Radial direction
L1: Thickness of the oscillation part
L2: Width of the oscillation part
L3: Length in the radial direction of the oscillation part
θ: Inclination angle

The invention claimed is:

1. An ultrasonic transducer for a measuring device that transmits and receives ultrasonic waves, comprising:
a housing container with a support body; and
a piezoelectric element with a substantially circular outer shape supported by the support body,
wherein the piezoelectric element includes;
multiple substantially sector-shaped oscillation parts that are divided by multiple grooves that communicate with each other at a central part and extend radially, and
soundproof sheets with double-sided tape arranged to fill multiple grooves in order to join and fix the multiple adjacent oscillation parts to each other so as to oscillate in a thickness direction in a first frequency band, as well as to oscillate in a radial direction in a second frequency band, which is lower than the first frequency band.

2. The ultrasonic transducer for a measuring device according to claim 1, wherein the multiple oscillation parts are joined and fixed to each other at equal angles of inclination with respect to a plane perpendicular to a central axis of the piezoelectric element.

3. The ultrasonic transducer for a measuring device according to claim 1, wherein the support body is a support plate with a flat surface shape.

4. The ultrasonic transducer for a measuring device according to claim 1, wherein the piezoelectric element is composed of multiple oscillation parts that are divided into n parts (where n is 8 or more).

5. The ultrasonic transducer for a measuring device according to claim 1, wherein a thickness of the oscillation part is greater than a width of the oscillation part, and a length in the radial direction of the oscillation part is three times or more than the thickness of the oscillation part.

6. The ultrasonic transducer for a measuring device according to claim 1, wherein the oscillation part is positioned on a central side of the piezoelectric element and has a chamfered acute angle.

7. The ultrasonic transducer for a measuring device according to claim 1, wherein the support body is a support plate located on a front side of the housing container, and the multiple oscillation parts have a first surface which is an ultrasonic radiation surface and a second surface on the opposite side thereof, and the first surface is joined to an inner side of the support plate through an acoustic matching layer.

8. The ultrasonic transducer for a measuring device according to claim 1, wherein the support body is a support plate located on a rear side of the housing container, the multiple oscillation parts have a first surface which is an ultrasonic radiation surface and a second surface on the opposite side thereof, the second surface is joined to an inner side of the support plate through a backing material, and the first surface is molded with a filler.

9. An ultrasonic transducer for a measuring device that transmits and receives ultrasonic waves, comprising:
a housing container with a support body; and
a piezoelectric element with a substantially circular outer shape supported by the support body, wherein
the support body includes a surface shape corresponding to the pyramidal surface of a polygonal pyramid or polygonal truncated pyramid and is a support plate that is generally convex or concave on an outside of the support plate; and
the piezoelectric element includes;
multiple substantially sector-shaped oscillation parts that are divided by multiple grooves that communicate with each other at a central part and extend radially; and
soundproof sheets with double-sided tape arranged to fill multiple grooves in order to join and fix the multiple adjacent oscillation parts to each other, so as to oscillate in a thickness direction in a first frequency band, as well as to oscillate in a radial direction in a second frequency band, which is lower than the first frequency band.

* * * * *